United States Patent [19]

Chantelou

[11] Patent Number: 4,825,288

[45] Date of Patent: Apr. 25, 1989

[54] METHOD AND APPARATUS FOR PROCESSING VIDEO SIGNALS

[75] Inventor: Olivier Chantelou, Paris, France

[73] Assignee: U.S. Philips Corporation, New York, N.Y.

[21] Appl. No.: 40,452

[22] Filed: Apr. 16, 1987

[30] Foreign Application Priority Data

Apr. 25, 1986 [FR] France ................................. 8606031

[51] Int. Cl.$^4$ .......................... H04N 5/14; H04N 5/44
[52] U.S. Cl. ..................................... 358/166; 358/140; 358/160
[58] Field of Search ............... 358/160, 166, 180, 140, 358/141, 11, 12, 21 R, 37

[56] References Cited

U.S. PATENT DOCUMENTS 4,611,231  9/1986  Kobayashi ........................... 358/166

FOREIGN PATENT DOCUMENTS 163513  12/1985  European Pat. Off. .

OTHER PUBLICATIONS

Radio Mentor Elektronik, No. 5, 1975, p. 196.

*Primary Examiner*—Tommy P. Chin
*Attorney, Agent, or Firm*—Gregory P. Gadson

[57] ABSTRACT

A video signal processing method for use in a video signal converter includes the following operations: (a) a vertical filtering operation by calculating, at each point of a current line to be generated, a value resulting from weighting the values assigned to the points in the same horizontal position but appearing in at least two lines adjacent to this current line in the same field, the so-called current field; (b) a selection operation by sorting and choosing an intermediate value among the values thus sorted, the sorting operation being effected on a plurality of values one of which is the value obtained at the end of the vertical filtering operation and the other values of which are those assigned to points of the same position as said point of the current line but belonging at least to the field preceding and the field and subsequent to said current field; (c) a picture reconstitution operation by generating a non-interlaced video signal, the current line of said picture being constituted alternately by the corresponding line of the initial picture when said corresponding line is present and by a line reconstructed in accordance with the preceding filtering and selection operations when said corresponding line is not present.

3 Claims, 1 Drawing Sheet

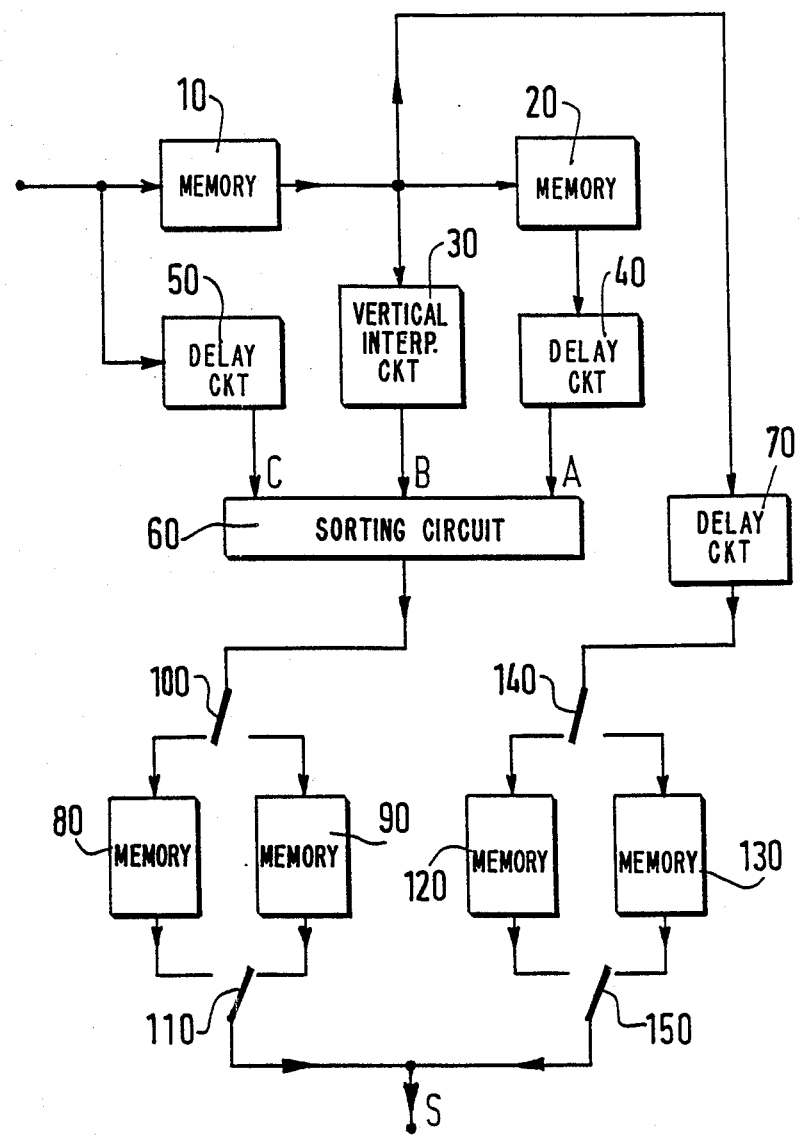

METHOD AND APPARATUS FOR PROCESSING VIDEO SIGNALS

BACKGROUND OF THE INVENTION

The present invention relates to a method of processing video signals comprising, among other operations, a switched video signal selection operation.

The invention also relates to a video signal converter for putting the method into effect.

The periodical "Radio Mentor Elektronik", no. 5, 1975, page 196, describes a method and a video signal processing arrangement in which more specifically a video signal selection operation is performed. This selection operation, associated with a following decision operation, is realized in a non-linear filter by means of which it is possible to obtain an enhanced picture quality.

SUMMARY OF THE INVENTION

The invention has for its object to provide a processing arrangement always including an operation of the selection type but which avoids a decision operation whose priciple causes flicker phenomena at the changeover points.

To this effect, the method according to the invention is characterized in that it comprises the following operations:

(a) a vertical filtering operation by calculating, in each point of a current line to be generted, a value resulting from weighting the values assigned to the points in the same horizontal position but belonging at least to two lines adjacent to this current line in the same field, the so-called current field;

(b) said selection operation, by sorting and choosing an intermediate value among the values thus sorted, the sorting operation being effected among a plurality of values one of which is the value obtained at the end of the vertical filtering operation and the other values of which are those assigned to po ints of the same position as said point of the current line but belonging at least to the field preceding and the field subsequent to said current field;

(c) a picture reconstitution operation by generating a non-interlaced video signal, the current line of said picture being constituted alternately by the corresponding line of the initial picture when said corresponding line is present, and by a line reconstructed in accordance with the preceding filtering and selection operations when said corresponding line is not present.

The method thus proposed is advantageous in the sense that its principle itself, which consists in sorting out the values and not by determining them by a decision operation, effectively prevents flicker phenomena from occurring in the switching points in the embodiments which make use of prior art methods. Moreover, for still pictures, the use of this method does not cause any loss in the spatial resolution, while, in the case of moving pictures, the absence of a weighting operation in the temporal direction substantially prevents any trailing effects.

Putting this method into effect is particularly interesting in the field of television. When used for television, in a preferred embodiment of the invention, a video signal converter for putting the method according to the invention into effect is characterized in that it comprises a vertical filtering circuit, a video signal selection circuit, and a non-interlaced final picture reconstitution circuit.

More accurately, in a preferred embodiment of the invention, said converter is characterized in that:

(a) the vertical filtering circuit comprises a vertical interpolation circuit that operates by weighting the signals associated with the current line and with two or a plurality of lines adjacent thereto in the same field, which is commonly referred to as the current field;

(b) the selection circuit comprises a first memory which delays the input signal for the duration of one field less half a line period, a second memory delaying the output signal of the first memory by the duration of a field plus half a line period, first and second delay circuits whose respective inputs are connected for the first one of these circuits to the input of the first memory and for the second one of these circuits to the output of the second memory, and a sorting circuit receiving at its three inputs the output signal of the second delay circuit, the output signal of the vertical interpolation circuit, and the output signal of the first delay circuit, respectively;

(c) the non-interlaced final picture reconstitution circuit comprises a first set of two memories which alternately receive the output of the sorting circuit and a second set of two memories which alternately receive the output signal of the first memory via a third delay circuit, the output signal of said processing arrangement being formed alternately by the output signal of the first set of memories or by the output signal of the second set of memories.

BRIEF DESCRIPTION OF THE DRAWINGS

Details and advantages of the invention will become more apparent from the following description which is given by way of non-limiting example with reference to the drawing comprising only one figure which illustrates a preferred embodiment of a video signal converter according to the invention.

DETAILED DESCRIPTION OF THE INVENTION

The method according to the invention comprises a vertical filtering operation, a selection operation and a non-interlaced video signal generating operation.

The vertical filtering operation is performed, on the basis of the input signals constituted by the consecutive digital samples of the sampled video signals corresponding to an interlaced two-field picture, by calculating in each point of a current line to be generated a value obtained from weighting the values assigned to points of the same horizontal position but belonging to lines adjacent to this current line in the same field. The number of adjacent lines which may thus be involved is at present equal to two, but may be different without departing from the scope of the invention.

The selection operation here consists of performing a sorting operation among three values, one of which is the value of the interpolation signal delivered at the end of the vertical filtering operation described in the foregoing and the two other values are those assigned to points in the same position as that of the current line for which the interpolation signal has just been determined but belonging to the field preceding and the field subsequent to the field containing this current line. Actually, to put it more accurately, in the example described the sorting operation performed is choosing that value of three values which occupies the intermediate position. This selection by means of sorting and choosing the intermediate value can of course be effected on a different number of values, odd or even, associated with a larger number of preceding and subsequent fields.

The operation of generating the non-interlaced video signal finally consists in a reconstitution of the non-interlaced final picture in which the current line corresponds either to a line of the original field, or to a line reconstituted in the manner described in the foregoing, that is to say by intra-field interpolation and consecutive ultra-field sorting operations. A temporary storage renders it possible to store alternately the line of the original field and the recovered line which will occur in succession in the non-interlaced final picture, formed by reading the memories at a twice higher rate than they are written, as this non-interlaced picture has of course a line duration which is twice shorter than the original basic picture.

An embodiment of a video signal converter for putting the method into effect, described in the foregoing, will now be proposed in FIG. 1. First of all this converter includes a vertical filtering circuit. A first memory 10 delays the input signal for the duration of one field less one half line period, and a second memory 20 delays the output signal of the first memory 10 for the duration of one field plus half a line period. The input signal being a sampled video signal which corresponds to a picture interlaced in two fields, the two signals at the input and the output of the memory 10 correspond to two lines which are in adjacent vertical positions in the picture, and the same holds for the two signals at the input and output of the memory 20. The two signals at the input of the memory 10 and at the output of the memory 20 are consequently shifted through precisely one picture. The vertical filtering circuit is a vertical interpolation circuit 30 which in each point calculates, for the line to be generated, the value corresponding to the signal by weighting the signals associated with points of the same horizontal position in two, or a plurality, of selected neighbouring lines. An example of the vertical interpolation circuit or line interpolator is described in, for example, European Patent Application EP-A-0163513.

The converter in accordance with the invention also includes, in association with the vertical filtering circuit, a signal selection circuit assembled from two memories 10 and 20, two delay circuits 40 and 50 and a sorting circuit 60. This sorting circuit 60 receives at its inputs A, B, C three signals which are separated by the duration of one field:

the signal at the input B is the interpolation signal supplied for the current field by the vertical interpolation circuit 30;

the signal at the input A and the signal at the input C are the two spatially corresponding signals in the same point as the signal at the input B but belonging to the field which precedes and to the field which is subsequent to the current field, respectively.

The delay circuits 40 and 50 are provided with the object of compensating for the delay produced by the interpolation operation of the circuit 30 and to guarantee the temporal realignment of the signals appearing at the inputs A, B, C. The sorting circuit 60 then chooses here, for each point, that value out of the three values which occupies the intermediate position and validates the corresponding signal.

The converter according to the invention finally comprises a final picture recovery circuit by generating a non-interlaced video signal. This circuit is formed on the one hand from a third delay circuit 70, and on the other hand from two sets of memories 80, 90 and 120, 130. The delay circuit 70 has for its object, as have also the circuits 40 and 50, to realign temporarily the signals appearing at the inputs of the sets of memories.

The mode of operation of these sets of memories is as follows. When, in the non-interlaced picture to be reconstituted at the output of the converter, the current line corresponds to a line formed by interpolation and sorting effected successively as described in the foregoing, the output signal of the sorting circuit 60 is stored in one of the memories 80 or 90 and is read during the operations concerning the subsequent line and which operations result in entering the output signal of the sorting circuit 60 into the other of the memories 80 or 90. Thus, the memories 80 and 90 are alternately in the write mode when the other memory is in the read mode, and the other way around, with the aid of the change-over switches 100 and 110 which precede and are subsequent to said memories and are always in the opposite position with respect to each other.

When in the non-interlaced final picture the current line corresponds to a line already present, the signal taken is the output signal of the field memory 10. Via the third delay circuit 70, this signal is applied to the write/read memories 120 and 130 which, in association with two change-over switches 140 and 150, operate in exactly the same mode as the components 80 to 110. Finally, at the output S, video signals are available by means of which it is possible to recover the non-interlaced final picture alternately from the output of the change-over switch 110 or from the output of the change-over switch 150. Final reading is effected at a rate which is twice higher than the writing rate, as the non-interlaced picture must have a line period which is twice shorter than the interlaced original basic picture.

I claim:

1. A method of processing video signals comprising a switched video signal selection operation, and the following operations:
    (a) a vertical filtering operation by calculating, at each element point of a first given line of the video signal, a value resulting from weighting values representing said video signal and assigned to the element points in corresponding horizontal positions but belonging at least to two lines adjacent to the first line in a first field of lines comprising said first given line;
    (b) said selection operation, by sorting and choosing an intermediate value among values thus sorted, a sorting operation being effected on a plurality of values, one of which is a value obtained at the end of the vertical filtering operation and the other values of which are those assigned to element points of the same position as said element point of the first line but belonging at least to the field preceding and the field subsequent to said first field; and
    (c) a picture reconstitution operation by generating a non-interlaced video signal, the first line of said picture being constituted alternately by a corresponding line of an initial picture when said corresponding line is present, and by a line comprising values provided by said filtering and selection operations when said corresponding line is not present.

2. A video signal converter comprising:

(a) a vertical filtering circuit for calculating, at each element point of a first given line of the video signal, a value resulting from weighting values representing said video signal and assigned to the element points in corresponding horizontal positions but belonging at least to two lines adjacent to the first line in a first field of lines comprising said first given line;

(b) a video signal selection circuit coupled to said vertical filtering circuit for sorting and choosing an intermediate value among values thus sorted, a sorting operation being effected on a plurality of values, one of which is a value obtained at the end of the vertical filtering operation and the other values of which are those assigned to element points of the same position as said element point of the first line but belonging at least to the field preceding and the field subsequent to said first field; and (c) a non-interlaced final picture reconstitution circuit coupled to said video signal selection circuit for generating a non-interlaced video signal, the first line of said picture being constituted alternately by a corresponding line of an initial picture when said corresponding line is present, and by a line comprising values provided by said filtering and selection operations when said corresponding line is not present.

3. A converter as claimed in claim 2, wherein:

(a) the vertical filtering circuit comprises a vertical interpolation circuit that operates by weighting the signals associated with the current line and with at least two lines adjacent thereto in the same field, which is commonly referred to as the current field, (b) the selection circuit comprises a first memory which delays the input signal for the duration of one field less than half a line period, a second memory which delays the output signal of the first memory by the duration of a field plus half a line period, first and second delay circuits whose respective inputs are connected for the first one of these circuits to the input of the first memory and for the second one of these circuits to the output of the second memory, and a sorting circuit receiving at its three inputs the output signal of the second delay circuit, the output signal of the vertical interpolation circuit, and the output signal of the first delay circuit, respectively; and (c) the non-interlaced final picture reconstitution circuit comprises a first set of two memories which alternately receive the output of the sorting circuit and a second set of two memories which alternately receive the output signal of the first memory via a third delay circuit, the output signal of said converter being formed alternately by the output signal of the first set of memories or by the output signal of the second set of memories.

* * * * *